US009497599B2

(12) United States Patent
Abplanalp et al.

(10) Patent No.: US 9,497,599 B2
(45) Date of Patent: Nov. 15, 2016

(54) RECOMMENDING INFORMATION ASSOCIATED WITH A USER EQUIPMENT OR A COMMUNICATION GROUP IN A COMMUNICATIONS SYSTEM

(71) Applicant: QUALCOMM Incorporated, San Diego, CA (US)

(72) Inventors: Daniel Abplanalp, Salem, OR (US); Anthony Pierre Stonefield, San Diego, CA (US); Mark Aaron Lindner, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/701,847

(22) Filed: May 1, 2015

(65) Prior Publication Data

US 2015/0289115 A1    Oct. 8, 2015

Related U.S. Application Data

(62) Division of application No. 13/312,574, filed on Dec. 6, 2011, now Pat. No. 9,025,474.

(51) Int. Cl.
*H04W 4/08*     (2009.01)
*H04W 8/18*     (2009.01)
(Continued)

(52) U.S. Cl.
CPC ............... *H04W 4/08* (2013.01); *H04L 41/02* (2013.01); *H04L 67/1061* (2013.01);
(Continued)

(58) Field of Classification Search
CPC .................................................. H04W 8/005
See application file for complete search history.

(56) References Cited

U.S. PATENT DOCUMENTS 5,442,628 A    8/1995 Anderson et al.
5,594,947 A    1/1997 Grube et al.
(Continued)

FOREIGN PATENT DOCUMENTS

CA    WO 2013071395 A1 *  5/2013 ............. H04W 4/00
JP          2001119749 A      4/2001
WO          2009008660 A2    1/2009

OTHER PUBLICATIONS

International Preliminary Report on Patentability—PCT/US2012/068290—The International Bureau of WIPO Geneva, Switzerland, Jun. 3, 2014.
International Search Report and Written Opinion—PCT/US2012/068290—ISA/EPO—Mar. 20, 2013.
None

*Primary Examiner* — Andrew Lai
*Assistant Examiner* — Zhiren Qin
(74) *Attorney, Agent, or Firm* — Jia J. Wu

(57) ABSTRACT

In an embodiment, a communication device (e.g., a user equipment (UE), a server, etc.) determines one or more current parameters associated with an operating environment of the first UE, and then excludes at least one communication mode from one or more available communication modes to produce a set of communication modes by which a second UE is recommended to contact the first UE. In another embodiment, the communication device selectively recommends communication groups to users of UEs with current operational capabilities similar to characteristics of the recommended communication groups. In another embodiment, a server determines that a threshold number or a threshold percentage of group-members of an existing communication group are friends with a set of users that do not yet belong to the existing communication group, and then recommends that the set of users join the existing communication group.

19 Claims, 13 Drawing Sheets

(51) Int. Cl.
    *H04L 12/24*     (2006.01)
    *H04L 29/08*     (2006.01)
    *H04M 3/42*     (2006.01)
    *H04W 4/02*     (2009.01)
    *H04W 4/10*     (2009.01)
    *H04W 4/22*     (2009.01)
    *H04W 76/00*     (2009.01)
    *H04W 8/22*     (2009.01)
    *H04W 28/18*     (2009.01)
    *H04W 92/18*     (2009.01)

(52) U.S. Cl.
    CPC ....... *H04M 3/42348* (2013.01); *H04W 4/021* (2013.01); *H04W 4/10* (2013.01); *H04W 4/22* (2013.01); *H04W 8/18* (2013.01); *H04W 76/007* (2013.01); *H04W 8/22* (2013.01); *H04W 28/18* (2013.01); *H04W 92/18* (2013.01)

(56) References Cited

U.S. PATENT DOCUMENTS

| | | |
|---|---|---|
| 9,025,474 B2 | 5/2015 | Abplanalp et al. |
| 2006/0242234 A1* | 10/2006 | Counts .................. H04W 4/08 709/204 |
| 2009/0030988 A1 | 1/2009 | Kuhlke et al. |
| 2009/0068984 A1 | 3/2009 | Burnett |
| 2010/0082801 A1 | 4/2010 | Patel et al. |
| 2010/0144345 A1 | 6/2010 | Darrow et al. |
| 2010/0159879 A1 | 6/2010 | Salkini et al. |
| 2010/0279672 A1 | 11/2010 | Koskela et al. |
| 2010/0318491 A1 | 12/2010 | Anderson et al. |
| 2011/0016146 A1 | 1/2011 | Teufel |
| 2011/0029647 A1 | 2/2011 | Ginevan et al. |
| 2011/0078782 A1 | 3/2011 | Chan et al. |
| 2011/0111805 A1 | 5/2011 | Paquier et al. |
| 2011/0310284 A1 | 12/2011 | Tsujii |
| 2013/0012246 A1 | 1/2013 | Gilson |
| 2013/0091278 A1 | 4/2013 | Ludwig et al. |

\* cited by examiner

RECOMMENDING INFORMATION ASSOCIATED WITH A USER EQUIPMENT OR A COMMUNICATION GROUP IN A COMMUNICATIONS SYSTEM

CLAIM OF PRIORITY

The present application for patent is a Divisional of Non-Provisional application Ser. No. 13/312,574, entitled "RECOMMENDING INFORMATION ASSOCIATED WITH A USER EQUIPMENT OR A COMMUNICATION GROUP IN A COMMUNICATIONS SYSTEM", filed on Dec. 6, 2011, assigned to the assignee hereof and hereby expressly incorporated by reference herein.

BACKGROUND OF THE INVENTION

1. Field of the Invention

Embodiments of the invention relate to recommending information associated with a user equipment (UE) or a communication group in a communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN) or radio access network (RAN), which is generally a packet data network using standard Internet Engineering Task Force (IETF) based protocols that support methods for differentiating traffic based on Quality of Service (QoS) requirements. Therefore, the Node Bs generally interact with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

In an embodiment, a communication device (e.g., a user equipment (UE), a server, etc.) determines one or more current parameters associated with an operating environment of the first UE and determines a first set of communication modes by which the first UE can be contacted by the second UE. The communication device excludes, from the first set of communication modes, one or more communication modes to produce a second set of communication modes based on the determined one or more current parameters.

In another embodiment, the communication device monitors current operational capabilities associated with a UE and determines current group characteristics associated with a plurality of communication groups. The communication device then determines, based on the monitoring, that the current operational capabilities of the UE is similar to the current group characteristics of one or more of the plurality of communication groups, and recommends the one or more communication groups to the user of the UE.

In another embodiment, a server determines that a threshold number or a threshold percentage of group-members of an existing communication group are friends with a set of users that do not yet belong to the existing communication group, and then recommends that the set of users join the existing communication group.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
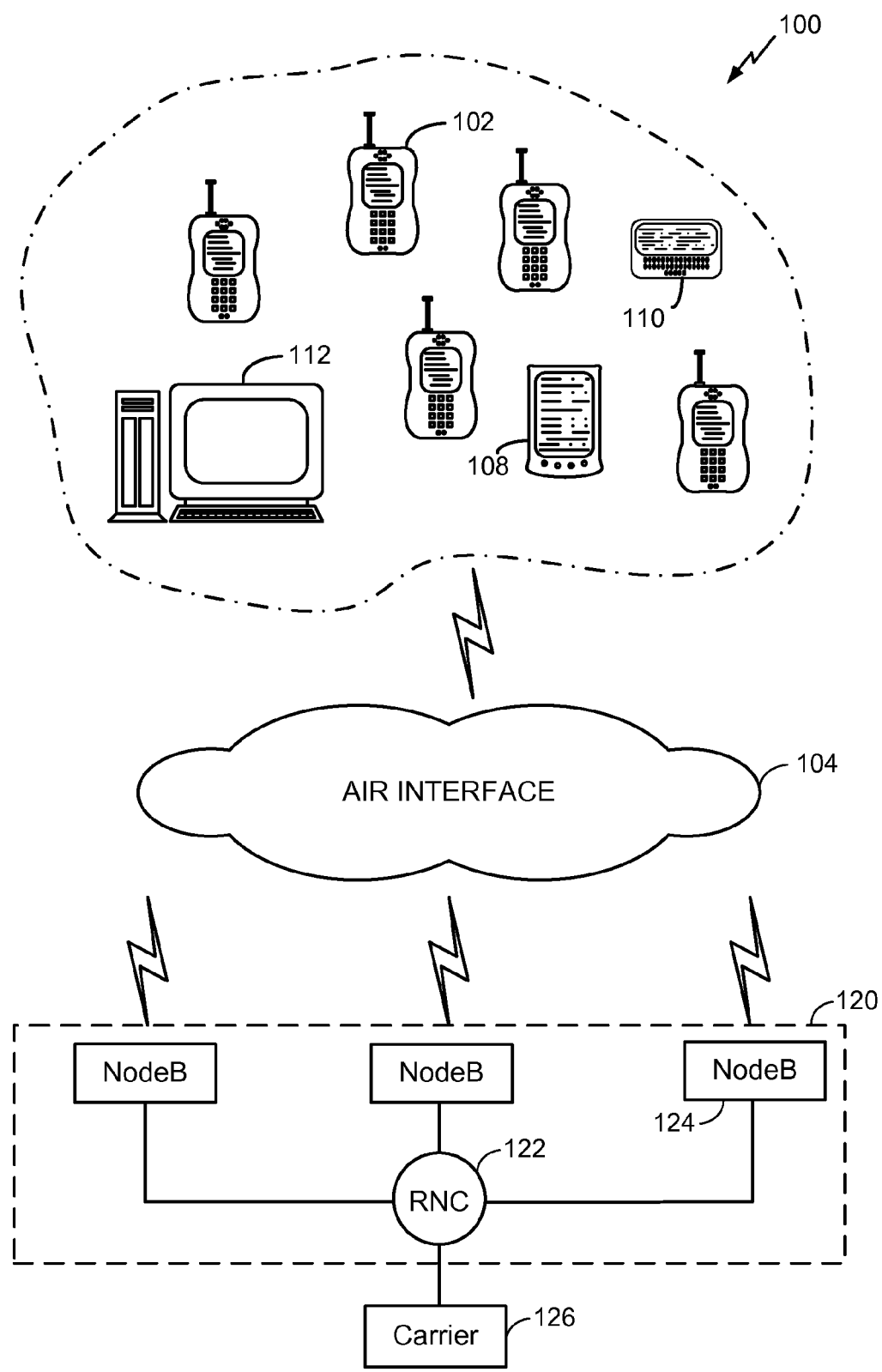
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action (e.g., described in more detail below with respect to FIG. 4).

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
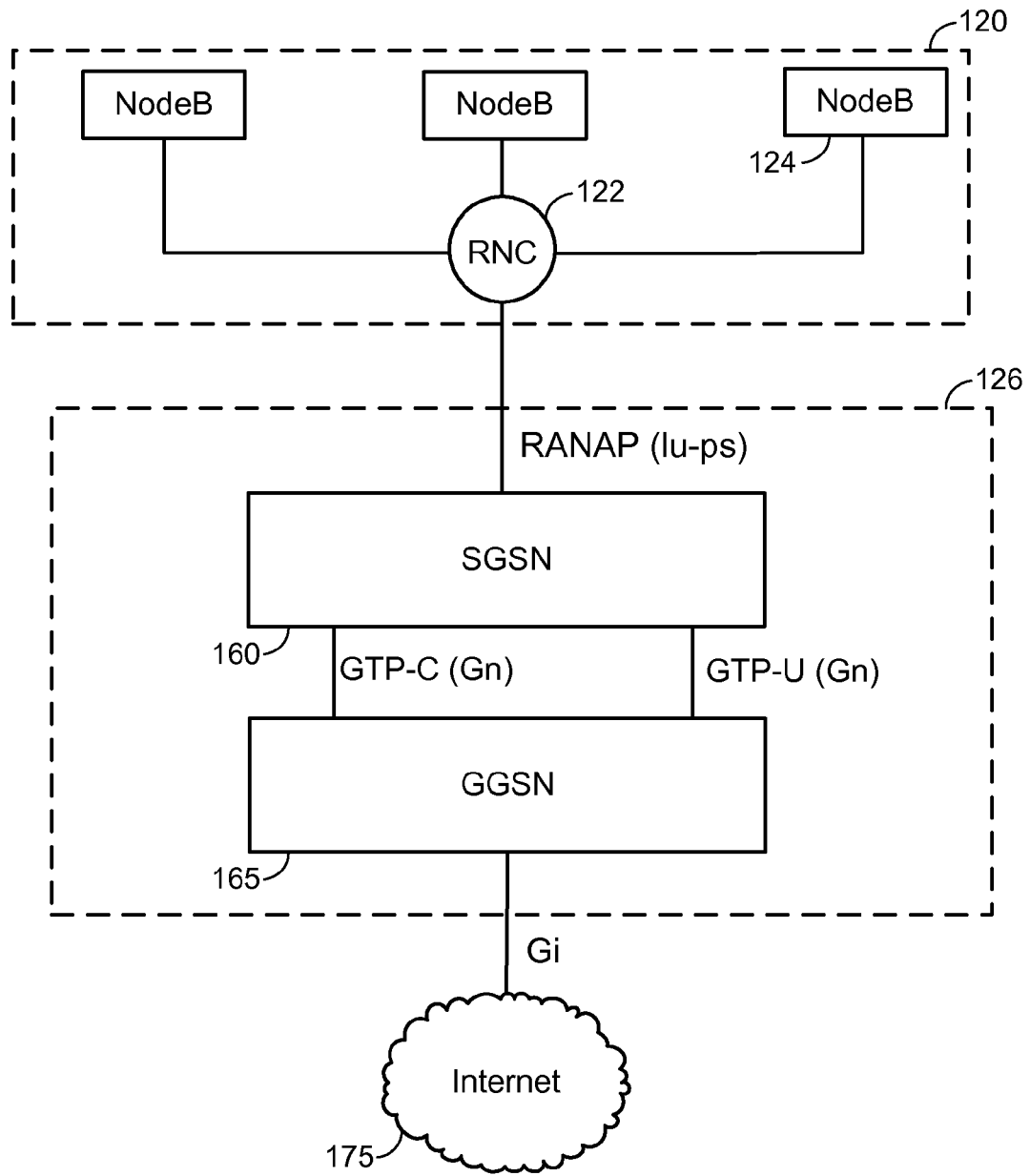
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the Internet (i.e., an external packet data network) 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Radio Access Network Application Part (RANAP) protocol. RANAP operates over a Iu interface (Iu-ps), with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). In the embodiment of FIG. 2A, the Gn between the SGSN 160 and the GGSN 165 carries both the GTP-C and the GTP-U. While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

Figure 2B:
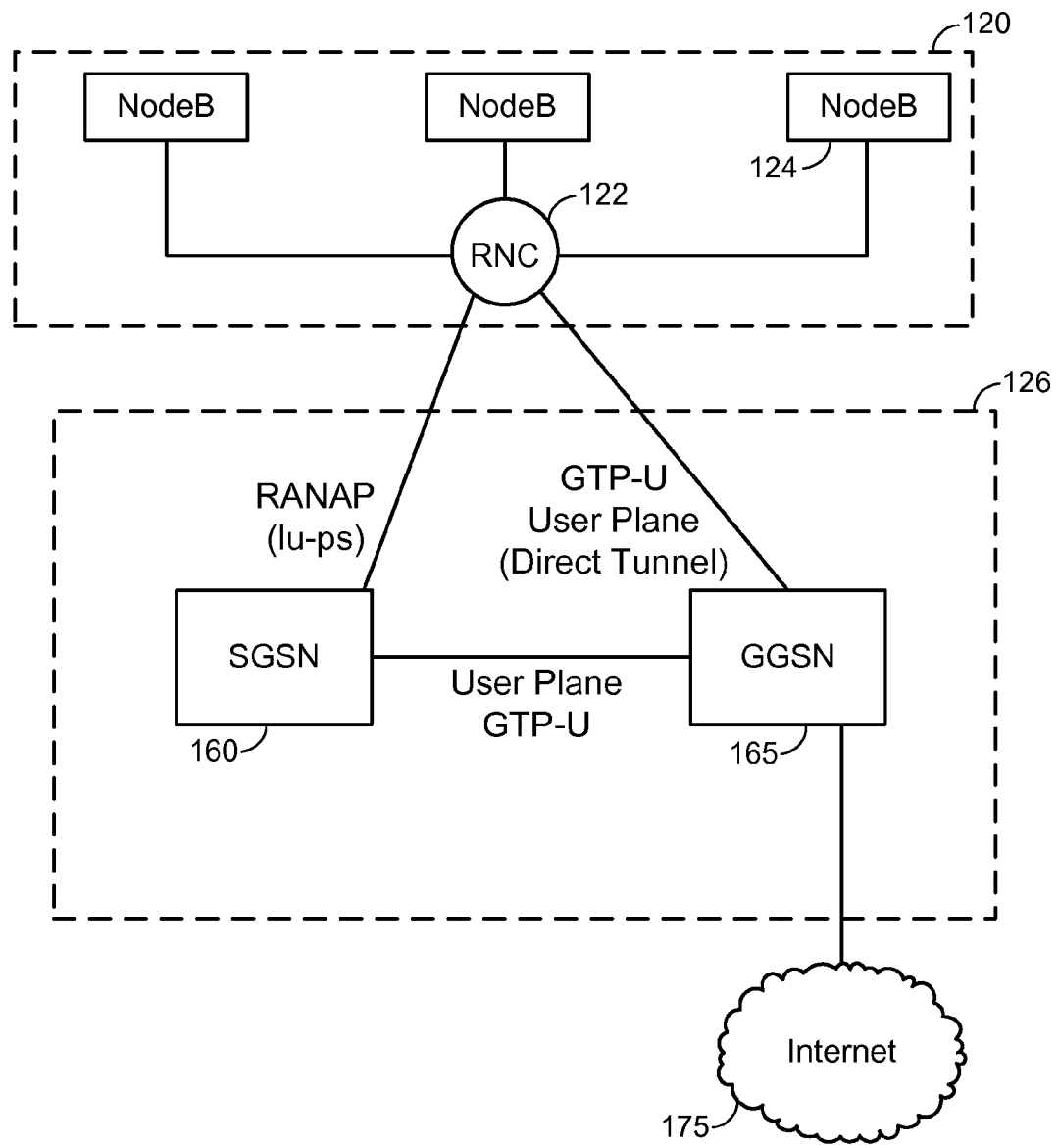
FIG. 2B illustrates the core network of FIG. 1 according to another embodiment of the present invention

FIG. 2B illustrates the core network 126 according to another embodiment of the present invention. FIG. 2B is similar to FIG. 2A except that FIG. 2B illustrates an implementation of direct tunnel functionality.

Direct Tunnel is an optional function in Iu mode that allows the SGSN 160 to establish a direct user plane tunnel, GTP-U, between RAN and GGSN within the Packet Switched (PS) domain. A direct tunnel capable SGSN, such as SGSN 160 in FIG. 2B, can be configured on a per GGSN and per RNC basis whether or not the SGSN can use a direct user plane connection. The SGSN 160 in FIG. 2B handles the control plane signaling and makes the decision of when to establish Direct Tunnel. When the Radio Bearer (RAB) assigned for a PDP context is released (i.e. the PDP context is preserved) the GTP-U tunnel is established between the GGSN 165 and SGSN 160 in order to be able to handle the downlink packets.

The optional Direct Tunnel between the SGSN 160 and GGSN 165 is not typically allowed (i) in the roaming case (e.g., because the SGSN needs to know whether the GGSN is in the same or different PLMN), (ii) where the SGSN has received Customized Applications for Mobile Enhanced Logic (CAMEL) Subscription Information in the subscriber profile from a Home Location Register (HLR) and/or (iii) where the GGSN 165 does not support GTP protocol version 1. With respect to the CAMEL restriction, if Direct Tunnel is established then volume reporting from SGSN 160 is not possible as the SGSN 160 no longer has visibility of the User Plane. Thus, since a CAMEL server can invoke volume reporting at anytime during the life time of a PDP Context, the use of Direct Tunnel is prohibited for a subscriber whose profile contains CAMEL Subscription Information.

The SGSN 160 can be operating in a Packet Mobility Management (PMM)-detached state, a PMM-idle state or a PMM-connected state. In an example, the GTP-connections shown in FIG. 2B for Direct Tunnel function can be established whereby the SGSN 160 is in the PMM-connected state and receives an Iu connection establishment request from the UE. The SGSN 160 ensures that the new Iu connection and the existing Iu connection are for the same UE, and if so, the SGSN 160 processes the new request and releases the existing Iu connection and all RABs associated with it. To ensure that the new Iu connection and the existing one are for the same UE, the SGSN 160 may perform security functions. If Direct Tunnel was established for the UE, the SGSN 160 sends an Update PDP Context Request(s) to the associated GGSN(s) 165 to establish the GTP tunnels between the SGSN 160 and GGSN(s) 165 in case the Iu connection establishment request is for signaling only. The SGSN 160 may immediately establish a new direct tunnel and send Update PDP Context Request(s) to the associated GGSN(s) 165 and include the RNC's Address for User Plane, a downlink Tunnel Endpoint Identifier (TEID) for data in case the Iu connection establishment request is for data transfer.

The UE also performs a Routing Area Update (RAU) procedure immediately upon entering PMM-IDLE state when the UE has received an RRC Connection Release message with cause "Directed Signaling connection re-establishment" even if the Routing Area has not changed since the last update. In an example, the RNC will send the RRC Connection Release message with cause "Directed Signaling Connection re-establishment" when the RNC is unable to contact the Serving RNC to validate the UE due to lack of Iur connection (e.g., see TS 25.331 [52]). The UE performs a subsequent service request procedure after successful completion of the RAU procedure to re-establish the radio access bearer when the UE has pending user data to send.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2C:
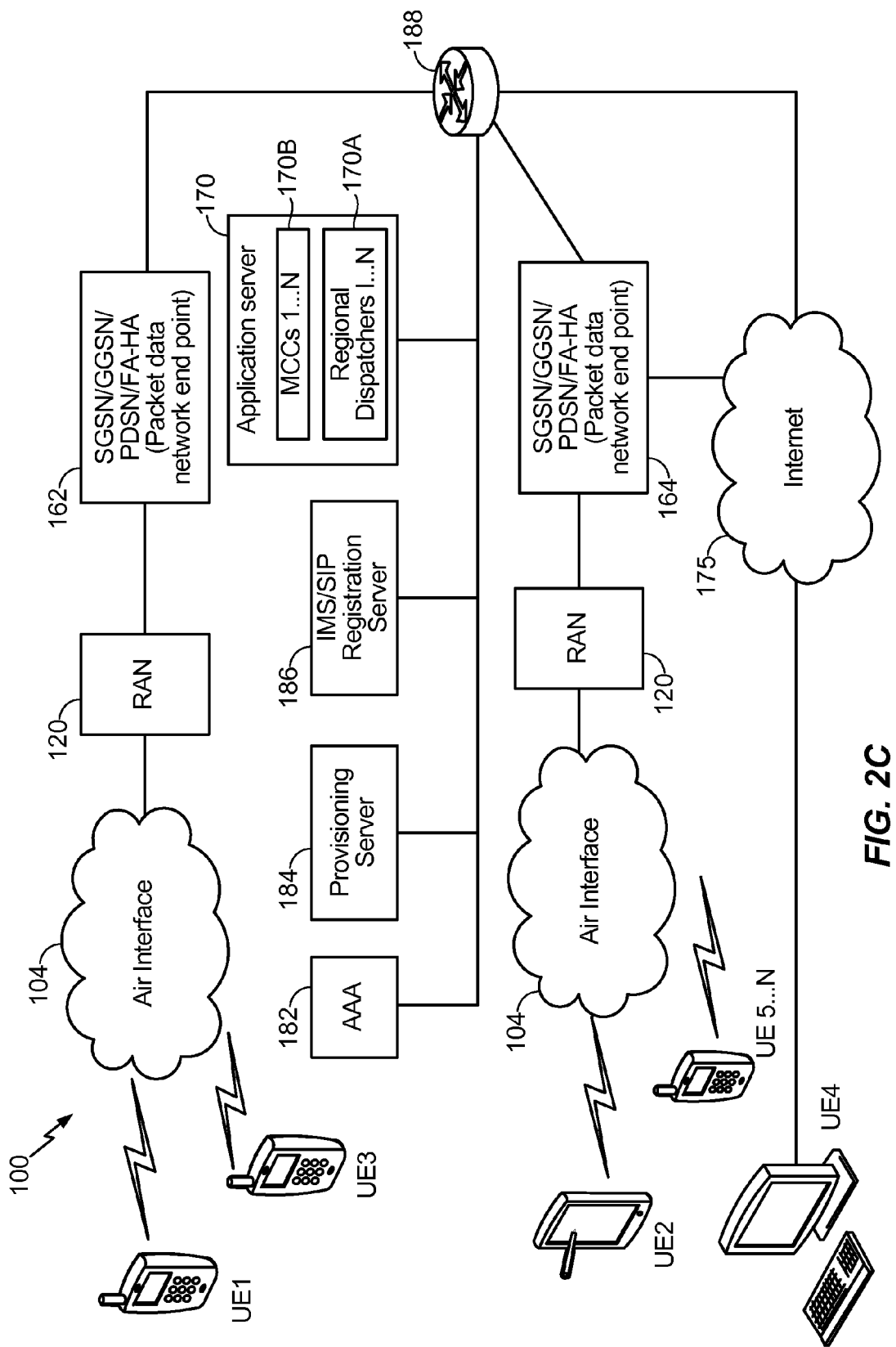
FIG. 2C illustrates an example of the wireless communications system of FIG. 1 in more detail.

FIG. 2C illustrates an example of the wireless communications system 100 of FIG. 1 in more detail. In particular, referring to FIG. 2C, UEs 1 ... N are shown as connecting to the RAN 120 at locations serviced by different packet data network end-points. The illustration of FIG. 2C is specific to W-CDMA systems and terminology, although it will be appreciated how FIG. 2C could be modified to conform with a 1×EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 ... N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2C, UEs 1, 3 and 5 ... N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2C are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2C, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions.

MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
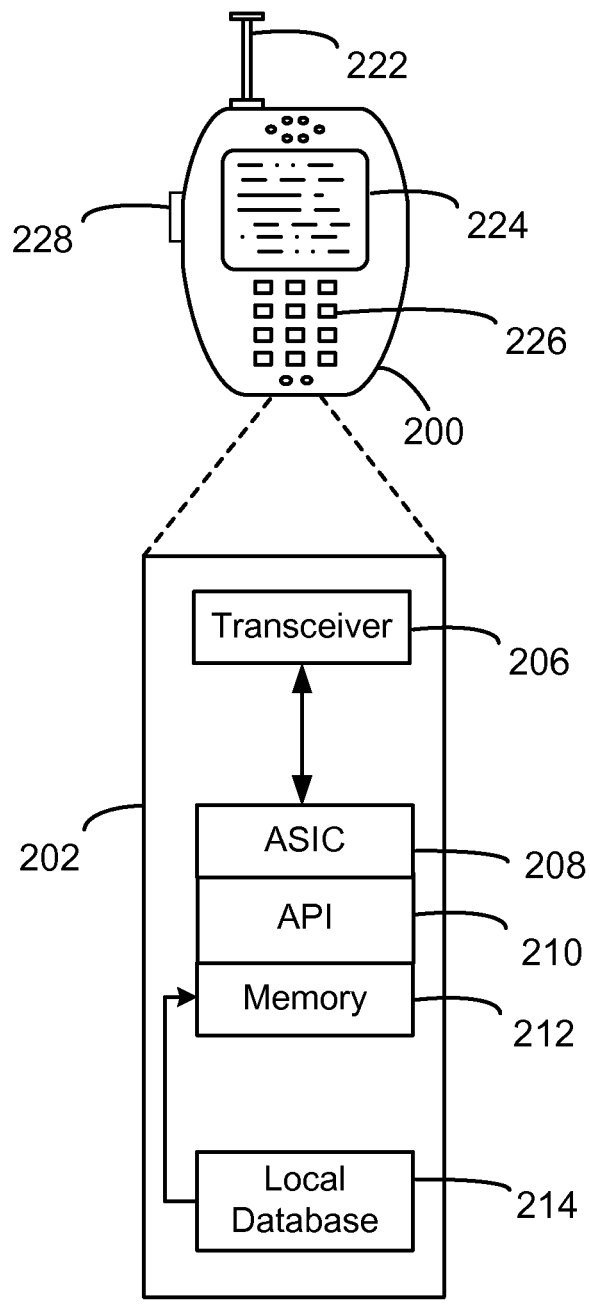
FIG. 3 is an illustration of a user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
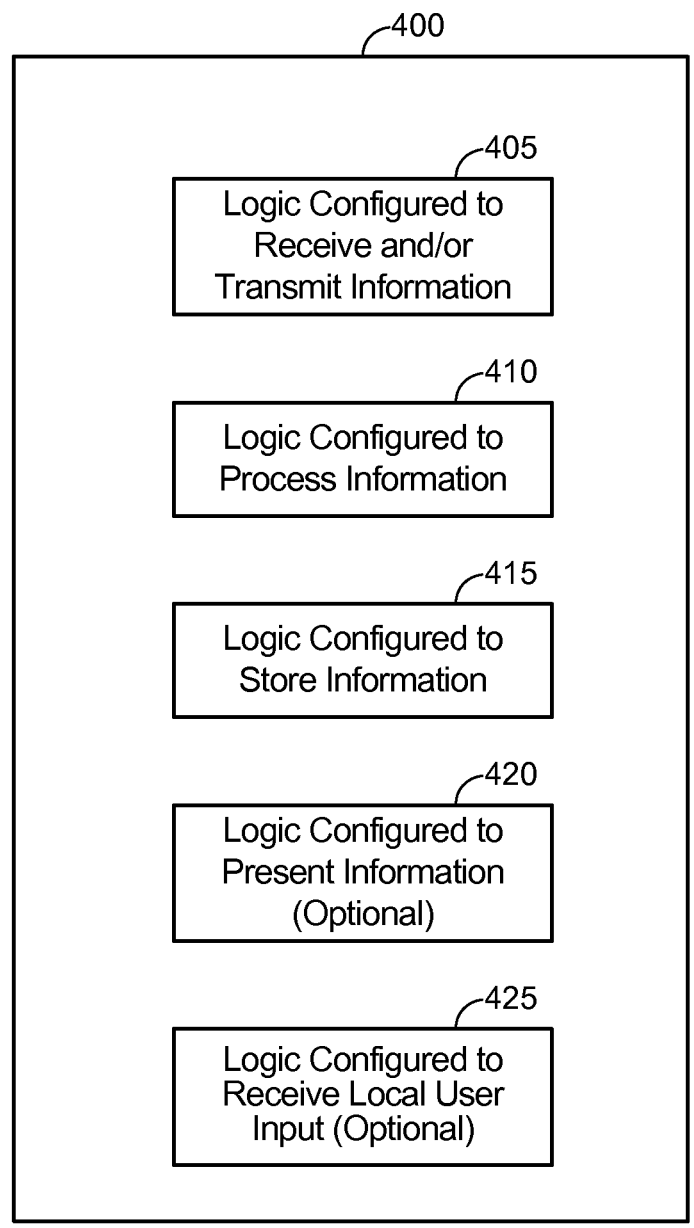
FIG. 4 illustrates a communication device 400 that includes logic configured to perform functionality.

FIG. 4 illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN 160, GGSN 165, a Mobility Management Entity (MME) in Long Term Evolution (LTE), etc.), any of the servers 170 through 186, etc. Thus, communication device 400 can correspond to any electronic device that is configured to communicate with (or facilitate communication with) one or more other entities over a network.

Referring to FIG. 4, the communication device 400 includes logic configured to receive and/or transmit information 405. In an example, if the communication device 400 corresponds to a wireless communications device (e.g., UE 200, Node B 124, etc.), the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., SGSN 160, GGSN 165, application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to display information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 200 as shown in FIG. 3, the logic configured to present information 420 can include the display 224. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 200 as shown in FIG. 3, the logic configured to receive local user input 425 can include the display 224 (if implemented a touch-screen), keypad 226, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 405. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410. Further, the configured logics or "logic configured to" of 405 through 425 are not limited to specific logic gates or elements, but generally refer to the ability to perform the functionality described herein (either via hardware or a combination of hardware and software). Thus, the configured logics or "logic configured to" of 405 through 425 are not necessarily implemented as logic gates or logic elements despite sharing the word "logic". Other interactions or cooperation between the configured logics 405 through 425 will become clear to one of ordinary skill in the art from a review of the embodiments described below in more detail.

Conventional UEs are capable of contacting other UEs via any of a plurality of user-specified communication modes, including but not limited to a circuit-switched audio call, a VoIP call, a video-conference (e.g., Facetime, etc.), Email, text or SMS messaging, multimedia or MMS messaging, and so on. However, different communication modes can be preferred by a target of a communication based on a "context" of the target. For example, a publicly accessible calendar may indicate that a target of a prospective communication is at a meeting, and a network-side server may notify a UE trying to contact the target of a prioritized list of communication modes that ranks inconspicuous communication modes (e.g., text or SMS message, etc.) over intrusive communication modes (e.g., a phone call, a video-conference, etc.) that the target is unlikely to accept while at the meeting. However, conventional communication mode prioritization schemes are typically passive in nature. For example, a UE trying to contact the target attending the meeting as noted above may be recommended to contact the target via a non-intrusive communication mode, but the UE is not specifically instructed to avoid contacting the target via the intrusive communication mode(s) and there is no actual enforcement mechanism aside from hoping that users refrain from selecting the lower-prioritized communication modes in the recommendation.

Accordingly, an embodiment of the invention is directed to selectively filtering out, explicitly disrecommending (i.e., explicitly recommending that certain communication modes not be selected) or excluding inappropriate communication modes by which a first UE can attempt initiation of a communication session with a second UE. In this embodiment, which will be described below with respect to FIGS. 5 through 6E, the first UE (or session originator) is explicitly asked or instructed to refrain from contacting the second UE (or session target) via the restricted communication mode(s) and/or is not provided with an option for contacting the second UE (or session target) via the excluded or restricted communication mode(s). As used herein, an exclusion of communication mode(s) by which a session originator contacts a session target can be enforced by (i) an explicit disrecommendation sent to the session originator asking the session originator to refrain from invoking the excluded communication mode(s) (but still theoretically permitting the session originator to override the disrecommendation) or (ii) blocking the session originator from selecting the excluded communication mode(s) altogether (i.e., no user override).

Figure 5:
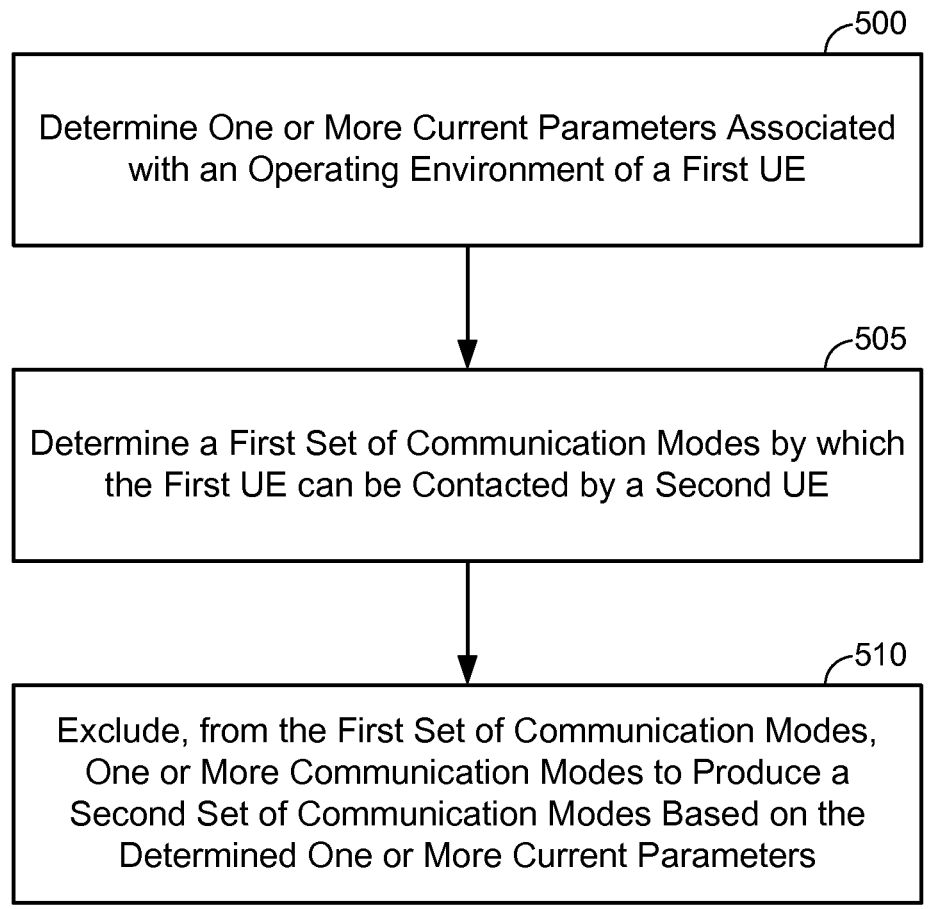
FIG. 5 illustrates a process of selectively excluding communication modes in accordance with an embodiment of the invention.

FIG. 5 illustrates a process of selectively excluding communication modes in accordance with an embodiment of the invention. The process of FIG. 5 is performed by a given communication entity. In one embodiment, the given communication entity may correspond to a network-side server (e.g., application server 170) as described below with respect to FIG. 6A. In another embodiment, the given communication entity may correspond to an originating UE that is attempting to originate a communication session with a target UE as described below with respect to FIG. 6B.

Referring to FIG. 5, the given communication entity determines one or more current parameters associated with an operating environment of a first UE (i.e., the target UE), 500. The given communication entity also determines a first set of communication modes by which the target UE can be contacted by a second UE (i.e., the originating UE), 505. For example, the first set of communication modes can include an exhaustive list of each potential communication mode by which the originating and target UEs can communicate. The given communication entity then excludes, from the first set of communication modes, one or more communication modes to produce a second set of communication modes based on the determined one or more current parameters, 510. A number of example implementations of FIG. 5 will now be described in more detail.

Referring to FIG. 5, in an example, the one or more current parameters determined at 500 can include an instant network capability associated with the target UE. For example, if the target UE is determined to be connected to a WLAN and is not connected to the RAN 120, the instant network capability can correspond to the target UE being unreachable by a cellular call or text message but reachable via a VoIP call or Email, such that the unreachable communication modes are excluded in 510. In another example, the target UE may be operating in a low-performance environment (e.g., low-bandwidth, no QoS, etc.), such that certain resource-intensive communication modes (e.g., video sessions, etc.) cannot be supported and are thereby excluded in 510.

Referring to FIG. 5, in another example, the one or more current parameters determined at 500 can include a determination that the target UE is operating in a location with a location restriction. For example, the target UE may be located at a movie theater or a library whereby an operator of the movie theater or library has the authority to restrict its customers from phone calls (text-only) while on the premises. In another example, the target UE may be located in an area with confidential information, whereby an operator of the area has the authority to restrict UEs on-site from any recording functions (no voice calls or audio recorder function, no video calls and no camera function). In these examples, the restricted communication modes are omitted (or excluded) from the first set of communication modes to produce the second set of communication modes in 510.

Referring to FIG. 5, in another example, the one or more current parameters determined at 500 can include an ambient noise level of the target UE. For example, the target UE may be at a very loud concert, resulting in a high ambient noise level that renders voice communication relatively useless, such that voice communication is omitted from the second set of communication modes at 510. In another example, a user of the target UE may be asleep or away from the target UE altogether, resulting in an especially low ambient noise level at the target UE, such that interactive communications (e.g., phone calls, video sessions, etc.) are not likely to be appropriate and are omitted from the second set of communication modes at 510.

Referring to FIG. 5, in another example, the one or more current parameters determined at 500 can include connection disruption frequency (i.e., a rate at which the target UE loses its connection, which can affect how long a real-time, interactive communication session is likely to last with the target UE before dropping out). For example, in inconsistent network conditions, UEs report presence differently such that the target UE only reports itself present on a network after a threshold level of signal quality and/or network stability is present, and communication modes over the network are excluded from the first set of communication modes to produce the second set of communication modes in 510 unless the above noted threshold(s) are satisfied. Thus, expensive network features can be reserved for more stable connections, and UEs with unstable connections can instead access asynchronous communication modes.

Referring to FIG. 5, in another example, the one or more current parameters determined at 500 can include current user preference settings for the target UE. For example, the target UE being placed in "silent" mode may cause communication modes associated with forced audio to be excluded from the first set of communication modes to produce the second set of communication modes at 510.

Referring to FIG. 5, in another example, the one or more current parameters at 500 can include current orientation for the target UE. For example, the target UE could be facedown on a surface, such that contacting the target UE via visual communication modes (e.g., text message, etc.) are excluded from the first set of communication modes to produce the second set of communication modes at 510.

Referring to FIG. 5, in another example, the one or more current parameters determined at 500 can include current device capabilities of the target UE. For example, the target UE lacking a front-facing camera, having a broken or inoperative front-facing camera or having a de-activated camera (e.g., at a software level, or by virtue of the camera being covered) may cause communication modes associated with video conferences to be excluded from the second set of communication modes at 510. In another example, the target UE being connected and paired to a Bluetooth headset implies that the target UE prefers voice data, such that non-voice communication modes are excluded from the second set of communication modes at 510. In another example, if the target UE supports Near Field Communication (NFC), communication modes that do not use NFC may be excluded at 510. In another example, if the target UE is already engaged in a voice call or a video-call, communication modes that are not conducive for interrupting the target UE's current communication session may be excluded at 510. In another example, if the target UE has multiple SIM cards that are associated with different levels of performance, communication modes invoking the lesser performance card can be excluded at 510.

Referring to FIG. 5, in another example, the one or more current parameters determined at 500 include a current manner in which the target UE is being used. For example, if a user of the target UE is currently engaged in a typing mode, non-text communication modes can be excluded at 510. In another example, if the user of the target UE is interacting with a virtual keyboard, non-text communication modes can be excluded at 510. In another example, if NFC is currently activated at the target UE, non-NFC modes can be excluded at 510. In another example, if the target UE is currently being held in landscape mode, this is suggestive of the user of the target UE engaging in a picture-taking activity such that non-photo communication modes are excluded at 510. In another example, if the target UE is currently being held face-down or screen-down, this is suggestive of the user of the target UE does not want to engage in a picture-taking activity such that photo-based communication modes are excluded at 510.

Referring to FIG. 5, in another example, the one or more current parameters determined at 500 include a cost associated with different communication modes at the target UE. For example, if the target UE has used 300 text messages out of a SMS/data plan that permits 500 text messages, texting may be permitted. However, if the target UE already exceeds the 500-text limit (meaning subsequent text messages are more expensive), then texting can be excluded at 510. In another example, if the target UE is approaching or has exceeded a SMS/data plan data-usage cap, bandwidth intensive communication modes can be excluded at 510 (unless the target UE is WiFi-connected, in an example). In another example, if the target UE has multiple SIM cards that are associated with different costs, communication modes invoking the more expensive SIM card can be excluded at 510.

Figure 6A:
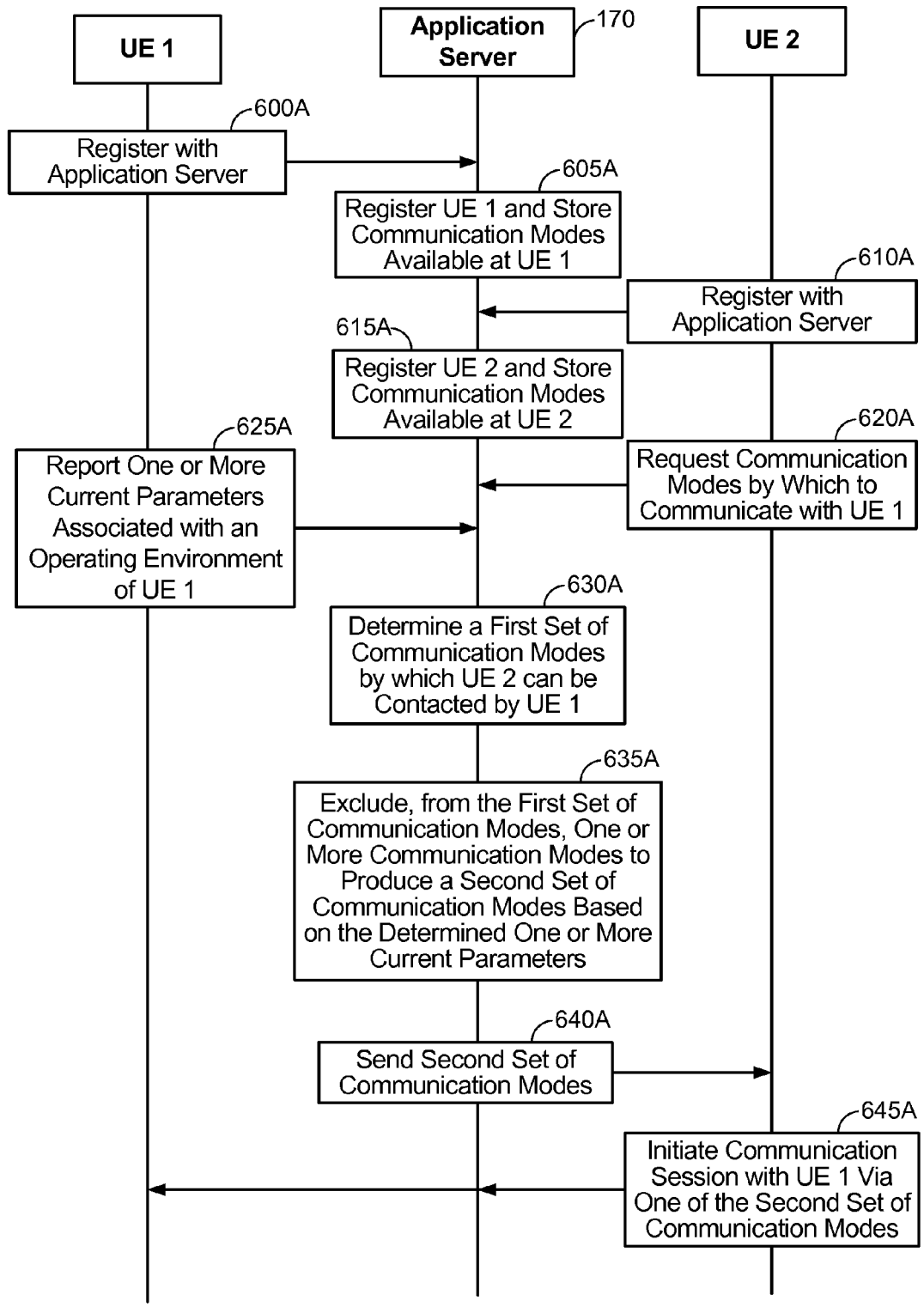
FIG. 6A illustrates an example of the process of FIG. 5 being implemented at an application server in accordance with an embodiment of the invention.

FIG. 6A illustrates a process of setting up a communication session based on an execution of the process of FIG. 5 at the application server 170 in accordance with an embodiment of the invention. Referring to FIG. 6A, UE 1 registers with the application server 170 and indicates its available communication modes, 600A, and the application server 170 registers UE 1 and also stores the communication modes that are available at UE 1, 605A. Similarly, UE 2 registers with the application server 170 and indicates its available communication modes, 610A, and the application server 170 registers UE 2 and also stores the communication modes that are available at UE 2, 615A.

Referring to FIG. 6A, UE 2 requests, from the application server 170, a set of communication modes by which to communicate with UE 1, 620A. In an example, the request at 620A can occur before the UE 2 wants to initiate an actual communication session with UE 1, such that the request of 620A corresponds to a request by UE 2 to keep up-to-date with a recommended set of communication modes by which to contact UE 1 for future communication sessions. For example, 620A can correspond to UE 2 joining or registering to a communication group to which UE 1 also belongs. Alternatively, the request of 620A can occur in conjunction with set-up of a current communication session so that UE 2 can obtain a recommended set of communication modes by which to contact UE 1 for the current communication session.

Also, UE 1 reports one or more current parameters associated with its operating environment, 625A (e.g., as in 500 of FIG. 5). In an example, the report of 625A can occur on a periodic or time-triggered basis, or alternatively can occur on an event triggered basis. For example, the report of 625A can occur when a change to the operating environment of UE 1 is detected by UE 1, or in response to a request for the current parameters of UE 1's operating environment (e.g., sent in response to the request of 620A, in an example). Accordingly, the report of 625A can occur before the request of 620A is conveyed to the application server 170, the report of 625A can occur after the request of 620A is conveyed to the application server 170 (but not in response to the request) or the report of 625A can occur after, and responsive to, the request of 620A.

After obtaining the current parameters associated with the operating environment of UE 1 at 625A, the application server 170 determines a first set of communication modes by which UE 2 can contact UE 1, 630A (e.g., as in 505 of FIG. 5). For example, the first set of communication modes can correspond to the communication modes for UE 1 and UE 2 (from 605A and 615A) that overlap. After determining the first set of communication modes in 630A, the application server 170 excludes, from the first set of communication modes, one or more communication based on the one or more current parameters (from 625A) to produce a second set of communication modes (e.g., as in 510 of FIG. 5), 635A. After determining the second set of communication modes in 635A, the application server 170 sends the second set of communication modes to UE 2, 640A. In an example, as noted above, the excluded communication modes can be blocked altogether (i.e., no user override) so that the sending of 640A does not send the excluded communication modes and the excluded communication modes thereby are not available for selection by the user of UE 2. Alternatively, the excluded communication modes can be included in the sending of 640A, but the excluded communication modes can be accompanied by an explicit disrecommendation (i.e., the user of UE 2 can still override the disrecommendation and attempt contact to UE 1 via the excluded communication modes, but is discouraged from doing so). In FIG. 6A, assume that UE 2 receives the second set of communication modes and then initiates a communication session with UE 1 via one of the second set of communication modes, 645A (e.g., either soon after receiving the second set of communication modes, or at some later point in time when a user of UE 2 wishes to contact UE 1).

Figure 6B:
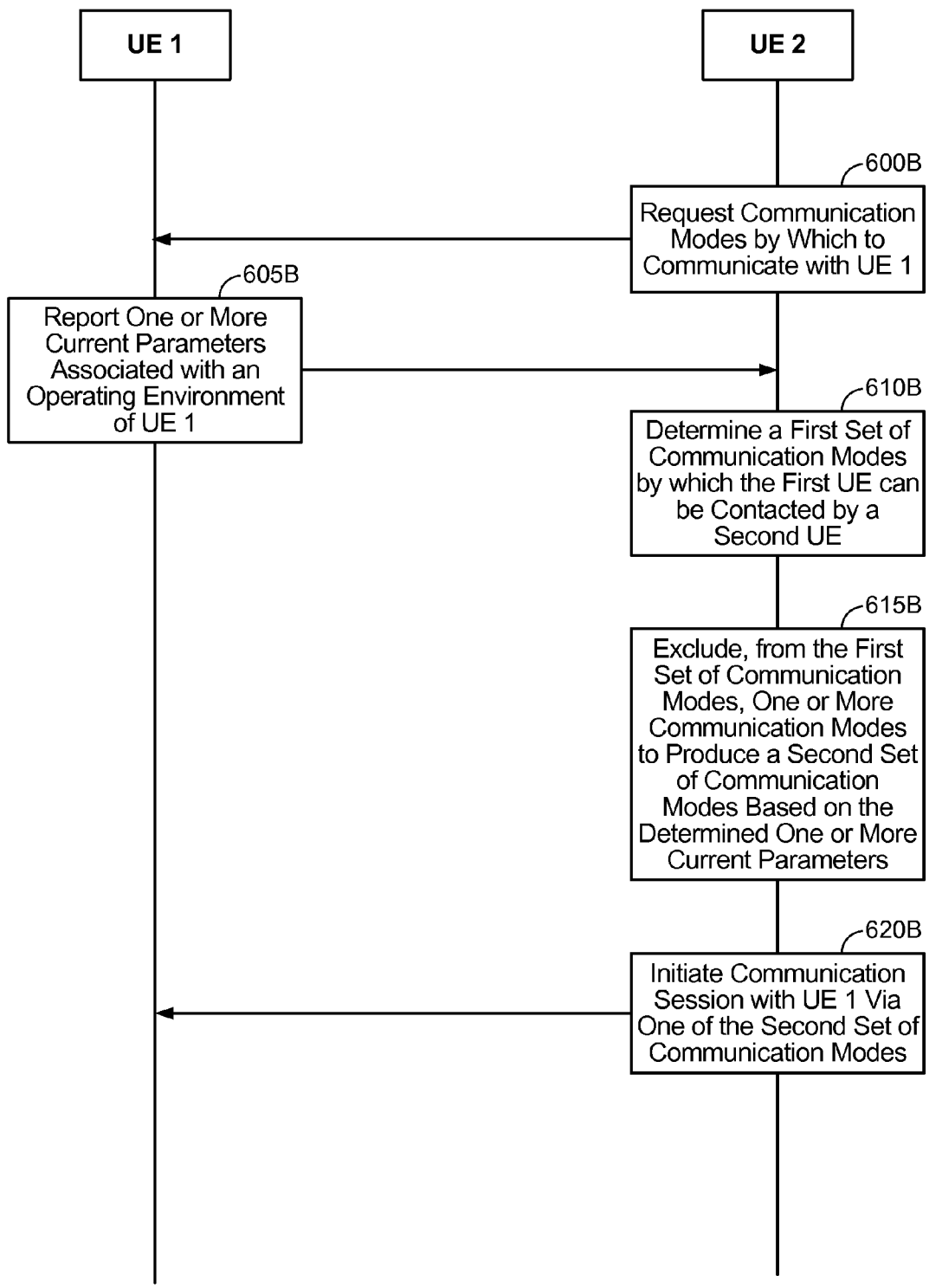
FIG. 6B illustrates an example of the process of FIG. 5 being implemented at a given UE in accordance with an embodiment of the invention.

FIG. 6B illustrates another process of setting up a communication session based on an execution of the process of FIG. 5 at the originating UE in an accordance with another embodiment of the invention. Referring to FIG. 6B, UE 2 requests, from UE 1, a set of communication modes by which to communicate with UE 1, 600B. In an example, the request of 600B can occur before the UE 2 wants to initiate an actual communication session with UE 1, such that the request of 600B corresponds to a request by UE 2 to keep up-to-date with a recommended set of communication modes by which to contact UE 1 for future communication sessions. Alternatively, the request of 600B can occur in conjunction with set-up of a current communication session so that UE 2 can obtain a recommended set of communication modes by which to contact UE 1 for the current communication session.

Referring to FIG. 6B, UE 1 responds to the request from 600B by reporting one or more current parameters associated with its operating environment, 605B (e.g., as in 500 of FIGS. 5 and 625A of FIG. 6A). After obtaining the current parameters associated with the operating environment of UE 1 at 605B, UE 2 determines a first set of communication modes by which UE 2 can contact UE 1, 610B (e.g., as in 505 of FIG. 5). For example, the first set of communication modes can correspond to each communication mode available at UE 2. In another example, the first set of communication modes can correspond to communication modes available at both UE 1 and UE 2 that overlap (e.g., if UE 2 has knowledge of UE 1's available communication modes, which may be conveyed with the report of 605B).

After determining the first set of communication modes in 610B, UE 2 excludes, from the first set of communication modes, one or more communication based on the one or more current parameters to produce a second set of communication modes (e.g., as in 510 of FIG. 5), 615B. After determining the second set of communication modes in 615B, UE 2 initiates a communication session with UE 1 via one of the second set of communication modes, 620B (e.g., either soon after determining the second set of communication modes, or at some later point in time when a user of UE 2 wishes to contact UE 1). As noted above, the excluded communication modes can be blocked altogether (i.e., no user override) so that the initiation of 620B is restricted to the second set of communication modes. Alternatively, the excluded communication modes are still available for selection by the user of UE 2 at 620B, but the excluded communication modes are explicitly discrecommended (i.e., the user of UE 2 can still override the discrecommendation and attempt contact to UE 1 via the excluded communication modes, but is discouraged from doing so).

Figure 6C:
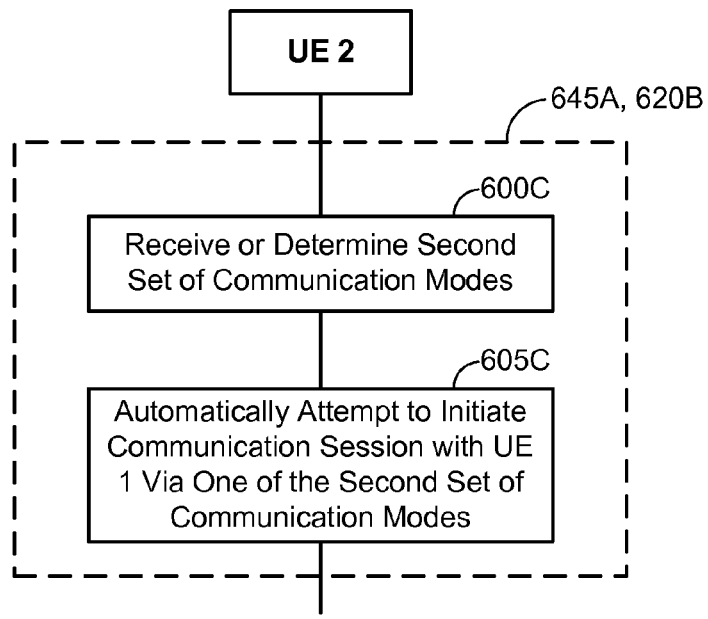
FIG. 6C illustrates an example implementation of a portion of FIG. 6A or 6B in accordance with an embodiment of the invention.
Figure 6D:
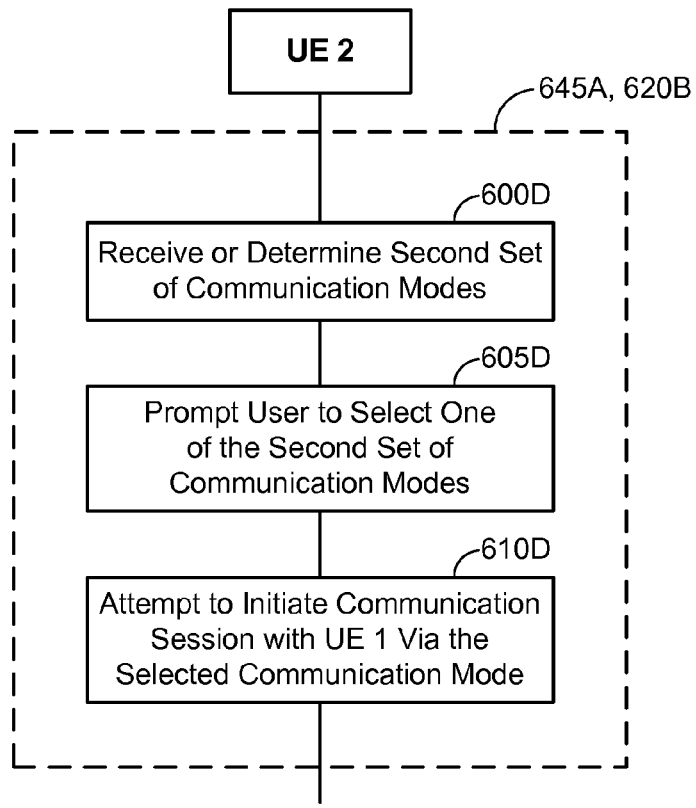
FIG. 6D illustrates another example implementation of a portion of FIG. 6A or 6B in accordance with an embodiment of the invention.

FIGS. 6C and 6D illustrate two alternative implementations of 645A of FIG. 6A and/or 620B of FIG. 6B in accordance with embodiments of the invention.

Referring to FIG. 6C, UE 2 receives (e.g., based on 640A of FIG. 6A) or determines (e.g., based on 615B of FIG. 6B) the second set of communication modes, 600C. At some point after obtaining the second set of communication modes, in response to a request from a user of UE 2 to initiate a communication session with UE 1 (e.g., which can be received before or during execution of FIG. 6C), UE 2 automatically attempts to initiate the requested communication session with UE 1 via one of the second set of communication modes (e.g., via a highest ranked communication mode from the second set of communication modes, in an example), 605C. Accordingly, the selection of the communication mode by which UE 2 contacts UE 1 is automated in FIG. 6C.

Referring to FIG. 6D, UE 2 receives (e.g., based on 640A of FIG. 6A) or determines (e.g., based on 615B of FIG. 6B) the second set of communication modes, 600D. At some point after obtaining the second set of communication modes, in response to a request from a user of UE 2 to initiate a communication session with UE 1 (e.g., which can be received before or during execution of FIG. 6D), UE 2 prompts its user to select one of the second set of communication modes, 605D. For example, the prompt of 605D can correspond to a presentation of the second set of communication modes on a display of UE 2. As noted above, the second set of communication modes can be presented exclusively (i.e., the excluded communication modes are not presented and cannot be selected by the user of UE 2, so there is no user override option). Alternatively, the excluded communication modes can still be presented, but can be presented in conjunction with an explicit disrecommendation so that a user override by the user of UE 2 and a selection of the excluded communication modes is still possible. If the second set of communication modes are ranked or prioritized, the higher-ranked communication modes can be displayed in a more prominent manner than the lower-ranked communication modes, in an example (e.g., at the top of the presented list, in a different color, etc.). After receiving a user selection in response to the prompt of 605D, UE 2 attempts to initiate the requested communication session with UE 1 via the selected communication mode, 610D.

As will be appreciated, in either FIG. 6C or 6D, the user is either not given the option to attempt communication with UE 1 via one of the excluded communication modes from 635A and/or 615B, or alternatively is given the option but is also explicitly disrecommended from actually selecting one of the excluded communication modes.

Figure 6E:
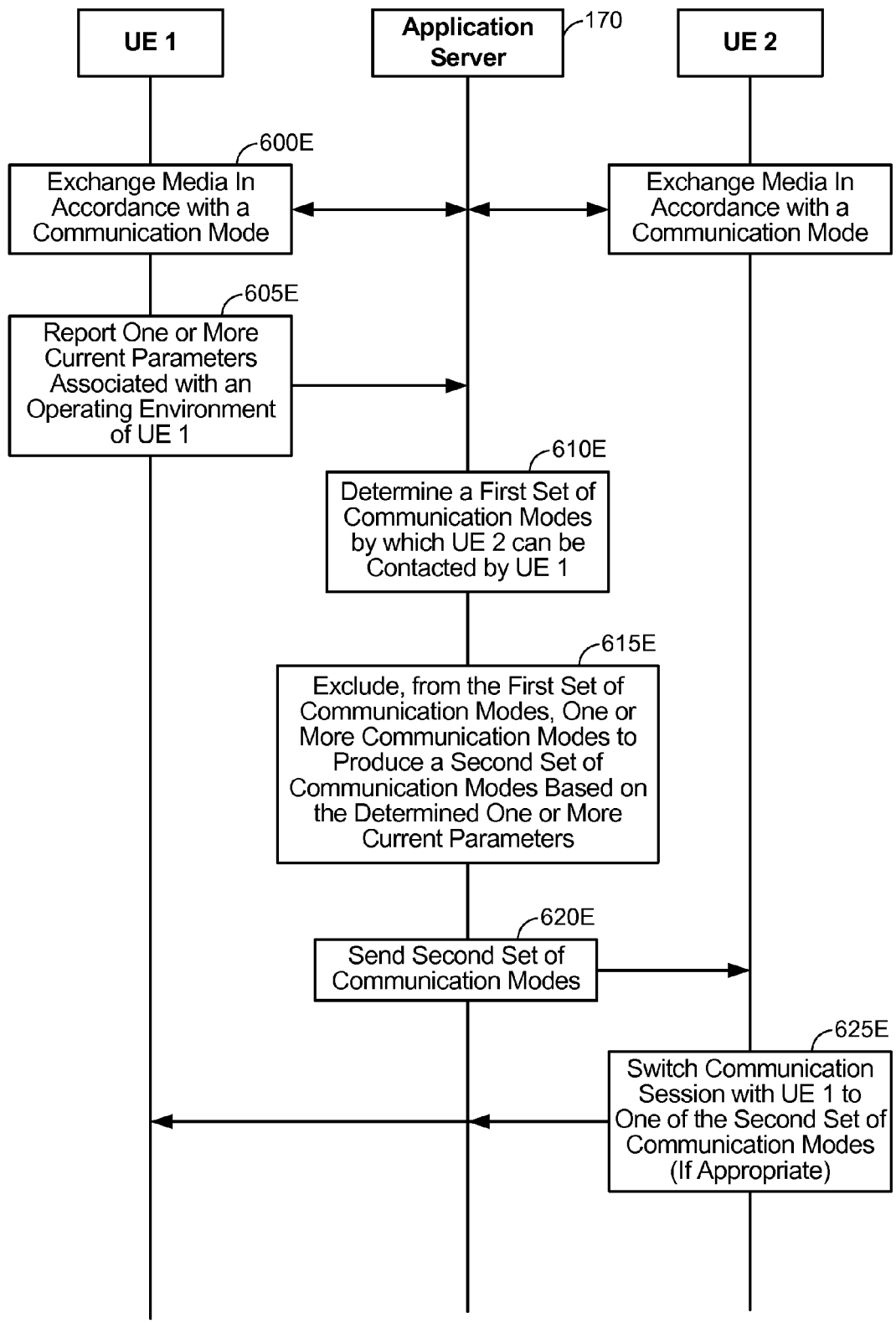
FIG. 6E illustrates a continuation of the process of FIG. 6A in accordance with an embodiment of the invention.

FIG. 6E illustrates a continuation of the process of FIG. 6A in accordance with an embodiment of the invention. In particular, FIG. 6A illustrates an example whereby UE 2 is provided with the second set of communication modes by which to initiate a communication session with UE 1, and FIG. 6E illustrates a communication mode-switch that can occur during an active communication session. While FIG. 6E illustrates a continuation of FIG. 6A and is thereby specific to the server-arbitrated implementation, it will be readily apparent how FIG. 6E could be modified to conform to a continuation of the process of FIG. 6B specific to an implementation where the application server 170 is not strictly required (e.g., an ad-hoc or P2P implementation).

Referring to FIG. 6E, assume that the process of FIG. 6A has executed and that the application server 170 is arbitrating a communication session between UE 1 and UE 2 via a first communication mode (e.g., a text session, a voice call, a video conference, a photo-sharing session, etc.), 600E. During the communication session, UE 1 reports one or more current parameters associated with its operating environment, 605E (e.g., as in 500 of FIG. 5 and/or 625A of FIG. 6A). In an example, the report of 605E can occur on a periodic or time-triggered basis during the communication session, or alternatively can occur on an event triggered basis during the communication session, similar to 625A of FIG. 6A. If periodic reporting is used for 605E, the interval between reports can be reduced while UE 1 is engaged in an active communication session (as in FIG. 6E) as compared to dormant periods where UE 1 is not actively engaged in communication.

After issuing the report in 605E, 610E through 620E correspond to 630A through 640A of FIG. 6A, respectively, and as such will not be described for the sake of brevity. Upon receiving the second set of communication modes from the application server 170 in 620E, if appropriate, UE 2 switches from a current communication mode to one of the second set of communication modes (e.g., or to one of the excluded communication modes if UE 2 is given a user override option and the user of UE 2 engages the user override option), 625E. For example, UE 2 may determine to recommend to perform a communication mode switch if its current communication mode with UE 1 has been excluded from the second set of communication modes received at 620E. In another example, UE 2 may determine not to perform a communication mode switch if its current communication mode with UE 1 is included in the second set of communication modes received at 620E. In another example, UE 2 may determine to perform a communication mode switch if its current communication mode with UE 1 is included in the second set of communication modes received at 620E, but another communication mode is ranked higher than its current communication mode.

With respect to FIG. 6E, it will be appreciated that any number of operating environment changes may prompt the above-described switching operation. For example, UE 1 may begin a voice call outside a concert (quiet environment) and then move into the concert (noisy environment), such that the voice call is switched to a more suitable communication mode (e.g., text conversation, video-only call, etc.). In another example, UE 1 may begin a voice call in a low-bandwidth environment (e.g., 1×, 3G, etc.) and then move into a high-bandwidth environment (e.g., WiFi, 4G, FEMTO cell, etc.), such that the voice call is switched to a more suitable communication mode (e.g., a video call, etc.). In another example, UE 1 may be connected to a cellular network and may have already exceeded his/her text limit, so UE 1 is initially blocked from entry into a texting session (e.g., any texts may be forwarded to the user of UE 1's email instead). Then, UE 1 transitions into a text-unlimited environment (e.g., WiFi, a home network, etc.) and is prompted to enter into the texting session. In another example, the user of UE 1 may lack a front-facing camera and may be discouraged for entering into a video session (or may be prompted to enter into the video session with voice only). Then, the user of UE 1 connects UE 1 to an external camera (or switches to a new UE altogether with video functionality) and is prompted to enter into the video session with video capability. Essentially, any of the operating environment examples described above with respect to FIG. 6A can begin, end or otherwise change during the communication session to prompt the switch to a more suitable or appropriate communication mode.

Figure 7:
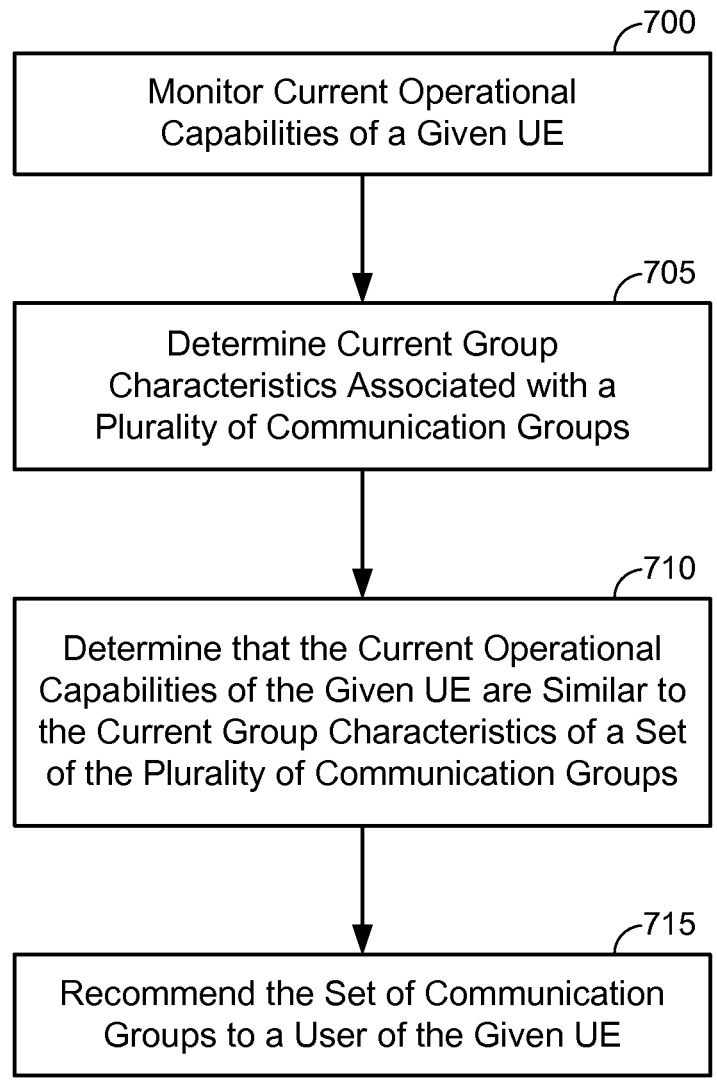
FIG. 7 illustrates a process of recommending a communication group based on current operational capabilities of a given UE in accordance with an embodiment of the invention.
Figure 8:
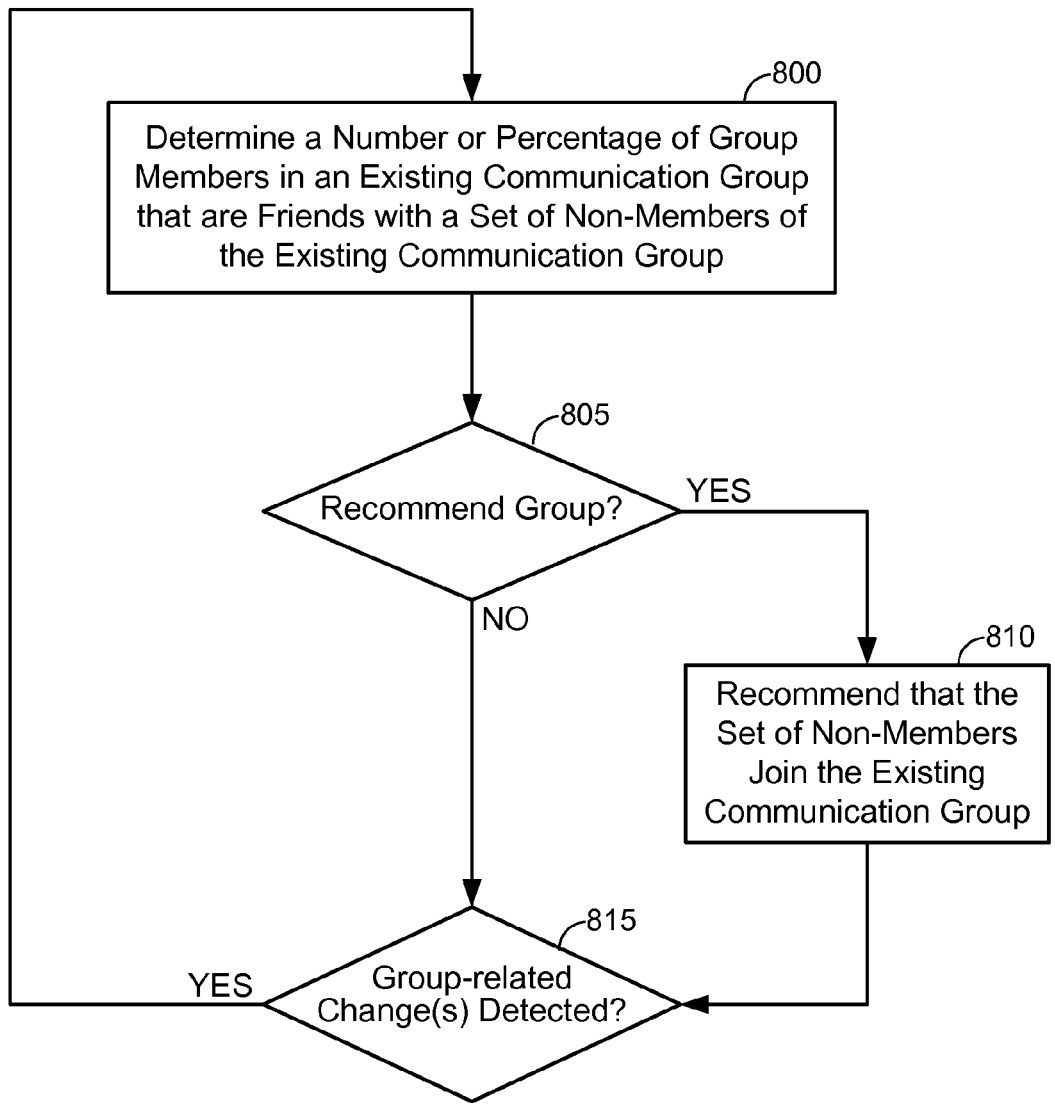
FIG. 8 illustrates a process of recommending a communication group based on commonality of friendship between group-members in a communication group and the user of the given UE in accordance with an embodiment of the invention.

While FIGS. 5 through 6E have focused on recommending a communication mode by which one UE can contact another UE, FIGS. 7 and 8 relate to processes for recommending a communication group (or social group) to a user of a given UE. Conventionally, group membership is manually configured by users, or alternatively is automatically populated based on very simple rules (e.g., "friends of friends", etc.). FIGS. 7 and 8 relate to communication group recommendations that are based on current operational capabilities of the given UE (e.g., FIG. 7) and/or based on a commonality of friendship between group-members in a communication group and the user of the given UE (e.g., FIG. 8).

Referring to FIG. 7, a given communication entity monitors current operational capabilities of a given UE, 700. For example, the given communication entity can correspond to the given UE itself, or alternatively the application server 170 (e.g., a social networking server, etc.). The given communication entity determines current group characteristics associated with a plurality of communication groups (e.g., social networking groups), 705. In 710, the given communication entity determines that the current operational capabilities of the given UE (e.g., from 700) are similar to the current group characteristics of a given set of the plurality of communication groups (e.g., from 705). Based on the determination from 710, the given communication entity recommends the given set of the plurality of communication groups to the given UE in 715. A number of example implementations of FIG. 7 will now be described.

Referring to FIG. 7, in an example, the current operational capabilities of the given UE determined at 700 can relate to a location and/or movement direction of the given UE. The current group characteristics for a particular communication group as determined at 705 can also relate to a location and/or movement direction. Based on the above-noted location and/or movement direction information, the given communication entity can determine that the given UE is in proximity to the particular communication group in 710. Alternatively, based on the above-noted location and/or movement direction information, the given communication entity can determine that the given UE and the particular communication group in 710 are converging on the same location.

Alternatively, the current group characteristics of the particular communication group can include a location on which the particular communication group is intending to converge, such as emergency responders traveling to the site of a reported disaster area. If the given UE is already located near the disaster area (or is already moving or converging towards the disaster area), the determination of 710 may deem the given UE a prospective group participant to the emergency response team in 710 and attempt to add the user of the given UE to the communication group in 715 (e.g., making the given UE privy to the dispatch communications relating to the emergency, etc.). In this case, the current operational capabilities of the given UE can include not only a proximity or convergence on a target location (e.g., the disaster area), but also a secondary indication that the user of the given UE is willing and/or able to assist the communication group's activities (e.g., the user of the given UE is known to be trained in CPR based on a user profile, the user of the given UE is known to be an off-duty police officer based on a user profile, etc.).

In another example, the target location or convergence location can correspond to a meeting room where a group of employees (i.e., the communication group) are converging to conduct a meeting. The given UE may not have been invited to this meeting (or may have been invited and then rejected the meeting), but may be currently located in the same city or building such that convenience of attending the meeting augments the likelihood that the given UE will want to attend the meeting. Thus, the current operational capabilities of the given UE in this case are the given UE's proximity to, or convergence towards, the meeting room (700), the current group characteristics are the group members' own proximity to, or convergence towards, the meeting room (705), results in a similarity that is determined by the given communication entity (710). Further, secondary factors can also affect the similarity determination of 710. For example, if the given UE has specialized knowledge related to the meeting agenda or is socially connected to one or more of the meeting participants (or group-members), the given communication entity may be more likely to recommend the communication group to the user of the given UE at 715.

FIG. 8 illustrates a process of recommending an existing communication group to one or more non-members of the existing communication group in accordance with an embodiment of the invention. Referring to FIG. 8, a given communication entity (e.g., the application server 170, which can be implemented as a social networking server) determines a number or percentage of group members in an existing communication group that are friends with a set of non-members of the existing communication group (e.g., 86% of group members are friends with at least one of non-members X, Y and Z, 72% of group members are friends with both X and Y but not Z, 8 out of 13 group-members are friends with non-member G, etc.), 800. The given communication entity then determines whether to recommend the existing communication group to the set of non-members of the existing communication group based on the determination, 805. For example, in 805, the given communication entity can determine to recommend the existing communication group to the set of non-members if the determined number or percentage from 800 is above a threshold, and the given communication entity can determine not to recommend the existing communication group to the set of non-members if the determined number or percentage from 800 is not above the threshold.

Referring to FIG. 8, if the given communication entity determines to recommend the existing communication group to the set of non-members in 805, a notification (e.g., an invitation to the existing communication group) is sent to the set of non-members that recommends that the set of non-members join the existing communication group, 810. Otherwise, if the given communication entity determines not to recommend the existing communication group to the set of non-members in 805, the given communication entity monitors changes to the existing communication group, such as changes in membership to the existing communication group and/or changes to the friend-statuses of the individual group-members, 815. So long as no changes are detected (e.g., no new group-members join the communication group, no group-members leave the communication group, no group-members add or drop friends, etc.), the given communication entity continues to monitor for group-related changes. When a group-related change is detected in 815, the process returns to 800 and repeats for the updated group state. For example, one of the non-members recommended to join the existing communication group may accept the recommendation from 810 and join the group, which changes the group membership and prompts a re-execution of the process of FIG. 8 to figure out whether any additional non-members should be invited to the existing communication group due to the new member(s).

While the embodiments above have been described with reference to GPRS architecture in 2G or W-CDMA-based 3G networks, it will be appreciated that other embodiments can be directed to other types of network architectures and/or protocols. For example, the embodiments described above can be carried over to a Long-Term Evolution (LTE) network, whereby a combination of the RNC and the SGSN maps to a Mobility Management Entity (MME) for control plane and Serving Gateway (S-GW) for user plane traffic in LTE, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of recommending a communication group to a user of a user equipment (UE), comprising:
    monitoring current operational capabilities associated with the UE;
    determining current group characteristics associated with a plurality of communication groups;
    determining, based on the monitoring, that the current operational capabilities of the UE are similar to the current group characteristics of one or more of the plurality of communication groups; and
    recommending the one or more communication groups to the user of the UE,
    wherein the current operational capabilities include the UE being located near or moving or converging towards a disaster area, and
    wherein the recommending recommends the one or more communication groups to the user of the UE based upon a combination of the current operational capabilities of the UE and a first indication that the user of the UE has specialized knowledge or training to provide an emergency response function,
    wherein the monitoring, the determining of the current group characteristics, the determining of the current operational capabilities and the recommending are performed by the UE, an application server or a social networking server.

2. The method of claim 1, wherein the current operational capabilities associated with the UE are based on a current location of the UE.

3. The method of claim 2, wherein the current operational capabilities include the UE being in proximity to the one or more communication groups.

4. The method of claim 1, wherein the disaster area corresponds to a location at which the one or more communication groups are located.

5. The method of claim 1, wherein the disaster area corresponds to a location at which the one or more communication groups are moving or converging towards.

6. The method of claim 1, further comprising:
    receiving a second indication that the user of the UE is willing to contribute towards the emergency response function,
    wherein the recommending recommends the one or more communication groups to the user of the UE based upon a combination of the current operational capabilities of the UE and the first and second indications.

7. The method of claim 6,
    wherein the first indication indicates one or more proficiencies associated with the user of the UE for providing the emergency response function.

8. The method of claim 7, wherein the one or more proficiencies includes a Cardiopulmonary resuscitation (CPR) capability and/or a status of the user of the UE as an off-duty police officer.

9. A communication device configured to recommend a communication group to a user of a user equipment (UE), comprising:
    one or more circuits configured to:
    monitor current operational capabilities associated with the UE;
    determine current group characteristics associated with a plurality of communication groups;
    determine, based on the monitoring, that the current operational capabilities of the UE are similar to the current group characteristics of one or more of the plurality of communication groups; and
    recommend the one or more communication groups to the user of the UE,
    wherein the current operational capabilities include the UE being located near or moving or converging towards a disaster area, and
    wherein the one or more circuits recommend the one or more communication groups to the user of the UE based upon a combination of the current operational capabilities of the UE and a first indication that the user of the UE has specialized knowledge or training to provide an emergency response function,
    wherein the communication device corresponds to the UE, an application server or a social networking server.

10. The communication device of claim 9, wherein the current operational capabilities associated with the UE are based on a current location of the UE.

11. The communication device of claim 10, wherein the current operational capabilities include the UE being in proximity to the one or more communication groups.

12. The communication device of claim 9, wherein the disaster area corresponds to a location at which the one or more communication groups are located.

13. The communication device of claim 9, wherein the disaster area corresponds to a location at which the one or more communication groups are moving or converging towards.

14. The communication device of claim 9, wherein the one or more circuits are further configured to:
    receive a second indication that the user of the UE is willing to contribute towards the emergency response function,
    wherein the recommendation of the one or more communication groups to the user of the UE is based upon a combination of the current operational capabilities of the UE and the first and second indications.

15. The communication device of claim 14,
    wherein the first indication indicates one or more proficiencies associated with the user of the UE for providing the emergency response function.

16. A non-transitory computer-readable medium containing instructions stored thereon, which, when executed by a communication device configured to recommend a communication group to a user of a user equipment (UE), cause the communication device to perform actions, the instructions comprising:
    at least one instruction to cause the communication device to monitor current operational capabilities associated with the UE;

at least one instruction to cause the communication device to determine current group characteristics associated with a plurality of communication groups;

at least one instruction to cause the communication device to determine, based on the monitoring, that the current operational capabilities of the UE are similar to the current group characteristics of one or more of the plurality of communication groups; and at least one instruction to cause the communication device to recommend the one or more communication groups to the user of the UE, wherein the current operational capabilities include the UE being located near or moving or converging towards a disaster area, and wherein the at least one instruction to cause the communication device to recommend recommends the one or more communication groups to the user of the UE based upon a combination of the current operational capabilities of the UE and an indication that the user of the UE has specialized knowledge or training to provide an emergency response function, wherein the communication device corresponds to the UE, an application server or a social networking server.

17. The non-transitory computer-readable medium of claim 16, wherein the current operational capabilities associated with the UE are based on a current location of the UE.

18. The non-transitory computer-readable medium of claim 17, wherein the current operational capabilities include the UE being in proximity to the one or more communication groups.

19. The communication device of claim 16, wherein the disaster area corresponds to a location at which the one or more communication groups are located or moving or converging towards.

* * * * *